(12) United States Patent
Tashiro et al.

(10) Patent No.: US 8,189,993 B2
(45) Date of Patent: May 29, 2012

(54) MEDICAL SUPPORT CONTROL SYSTEM

(75) Inventors: Koichi Tashiro, Sagamihara (JP);
Masaru Ito, Yokohama (JP)

(73) Assignee: Olympus Medical Systems Corp. (JP)

( * ) Notice: Subject to any disclaimer, the term of this patent is extended or adjusted under 35 U.S.C. 154(b) by 1157 days.

(21) Appl. No.: 12/021,799

(22) Filed: Jan. 29, 2008

(65) Prior Publication Data
US 2009/0190897 A1 Jul. 30, 2009

(51) Int. Cl.
*H04N 9/80* (2006.01)
(52) U.S. Cl. ...................................... 386/248
(58) Field of Classification Search .................... 386/46, 386/248
See application file for complete search history.

(56) References Cited

U.S. PATENT DOCUMENTS

| | | | |
|---|---|---|---|
| 6,202,212 B1 * | 3/2001 | Sturgeon et al. | 725/141 |
| 2003/0093503 A1 * | 5/2003 | Yamaki et al. | 709/220 |
| 2005/0160364 A1 * | 7/2005 | Taniguchi et al. | 715/718 |
| 2008/0316304 A1 * | 12/2008 | Claus et al. | 348/61 |

FOREIGN PATENT DOCUMENTS

| | | |
|---|---|---|
| JP | 2005-000454 | 1/2005 |
| JP | 2006-000536 | 1/2006 |
| JP | 2006-136662 | 6/2006 |
| JP | 2006-141686 | 6/2006 |

* cited by examiner

*Primary Examiner* — Michael S McNally
(74) *Attorney, Agent, or Firm* — Ostrolenk Faber LLP

(57) ABSTRACT

A medical support control device to display on a display device an image captured by a medical device. The control device has access to a storage unit for storing display format types of the image displayed on the base of video signals output from the medical device and a prescribed order for the display format types, and a display switching unit for causing the display unit to display the image in the format in the prescribed order based on a display format switching signal from an operation unit of the medical device.

8 Claims, 12 Drawing Sheets

FIG.12

| DISPLAY FORMAT TABLE FOR USER 1 | | |
|---|---|---|
| SWITCHING VALUE | DISPLAY FORMAT | SETTING DATA |
| 1 | 180 DEGREES | A3 |
| 2 | 180 DEGREES | B3 |
| 3 | MIRROR | C3 |
| 4 | PIP | D3 |
| 5 | NORMAL | E3 |
| n | POP | N3 |

| DISPLAY FORMAT TABLE FOR USER 2 | | |
|---|---|---|
| SWITCHING VALUE | DISPLAY FORMAT | SETTING DATA |
| 1 | MIRROR | A4 |
| 2 | PIP | B4 |
| 3 | MIRROR | C4 |
| 4 | 180 DEGREES | D4 |
| 5 | 181 DEGREES | E4 |
| n | NORMAL | N4 |

• • • • • •

| DISPLAY FORMAT TABLE FOR PROCEDURE 1 | | |
|---|---|---|
| SWITCHING VALUE | DISPLAY FORMAT | SETTING DATA |
| 1 | POP | A1 |
| 2 | PIP | B1 |
| 3 | MIRROR | C1 |
| 4 | 180 DEGREES | D1 |
| 5 | NORMAL | E1 |
| n | POP | N1 |

| DISPLAY FORMAT TABLE FOR PROCEDURE 2 | | |
|---|---|---|
| SWITCHING VALUE | DISPLAY FORMAT | SETTING DATA |
| 1 | MIRROR | A2 |
| 2 | PIP | B2 |
| 3 | MIRROR | C2 |
| 4 | 180 DEGREES | D2 |
| 5 | NORMAL | E2 |
| n | NORMAL | N2 |

• • • • • •

MEDICAL SUPPORT CONTROL SYSTEM

BACKGROUND OF THE INVENTION

1. Field of the Invention

The present invention relates to a medical support control system for controlling medical devices and non-medical devices used for operations.

2. Description of the Related Art

Operating systems using medical controllers or the like for controlling medical devices such as endoscopes or the like used for operations have been proposed. Medical devices to be controlled such as electric knives, insufflation devices, endoscope cameras, light source devices, or the like are connected to the medical controller (also referred to as MC). Also, a display device, a manipulation panel, or the like is connected to the MC. The manipulation panel includes a display unit and a touch sensor, and is used as a central manipulation device by nurses or the like working in an unsterilized area. The display device is used for displaying endoscope images or the like.

There is audio-visual equipment in the operating room such as a room light, a room camera, an interphone device, a liquid crystal display device, or the like (non-medical devices). The audio-visual equipment is controlled independently or by a non-medical controller (also referred to as an NMC) used for the central control.

Japanese Patent Application Publication No. 2006-000536, for example, discloses an operating system, comprising:

a first controller connected to a medical device provided in an operating room;

a second controller connected to a non-medical device provided in the operating room; and manipulation instruction input means transmitting the content of a manipulation instruction to the first controller when the manipulation instruction to the medical device or the non-medical device is input. The first controller transmits to the second controller a first control signal in accordance with the manipulation instruction of the non-medical device input into the manipulation instruction means. The second controller converts the first control signal into a second control signal used for controlling the non-medical device, and transmits the second control signal to the non-medical device. Thereby, the operating system and a non-medical system work together, and the operating person himself/herself or the like can manipulate the non-medical devices.

SUMMARY OF THE INVENTION

A medical support control system that causes a display device to display an image shot by a medical device, comprising:

storage means having stored, in a prescribed order, types of display formats of images to be displayed in accordance with video signals output from a medical device; and display switching means causing the display device to display images in the display formats in accordance with a display format switching signal from a manipulation unit in the medical device.

BRIEF DESCRIPTION OF THE DRAWINGS

FIG. 12 shows tables for a variation example.

DESCRIPTION OF THE PREFERRED EMBODIMENTS

Figure 1:
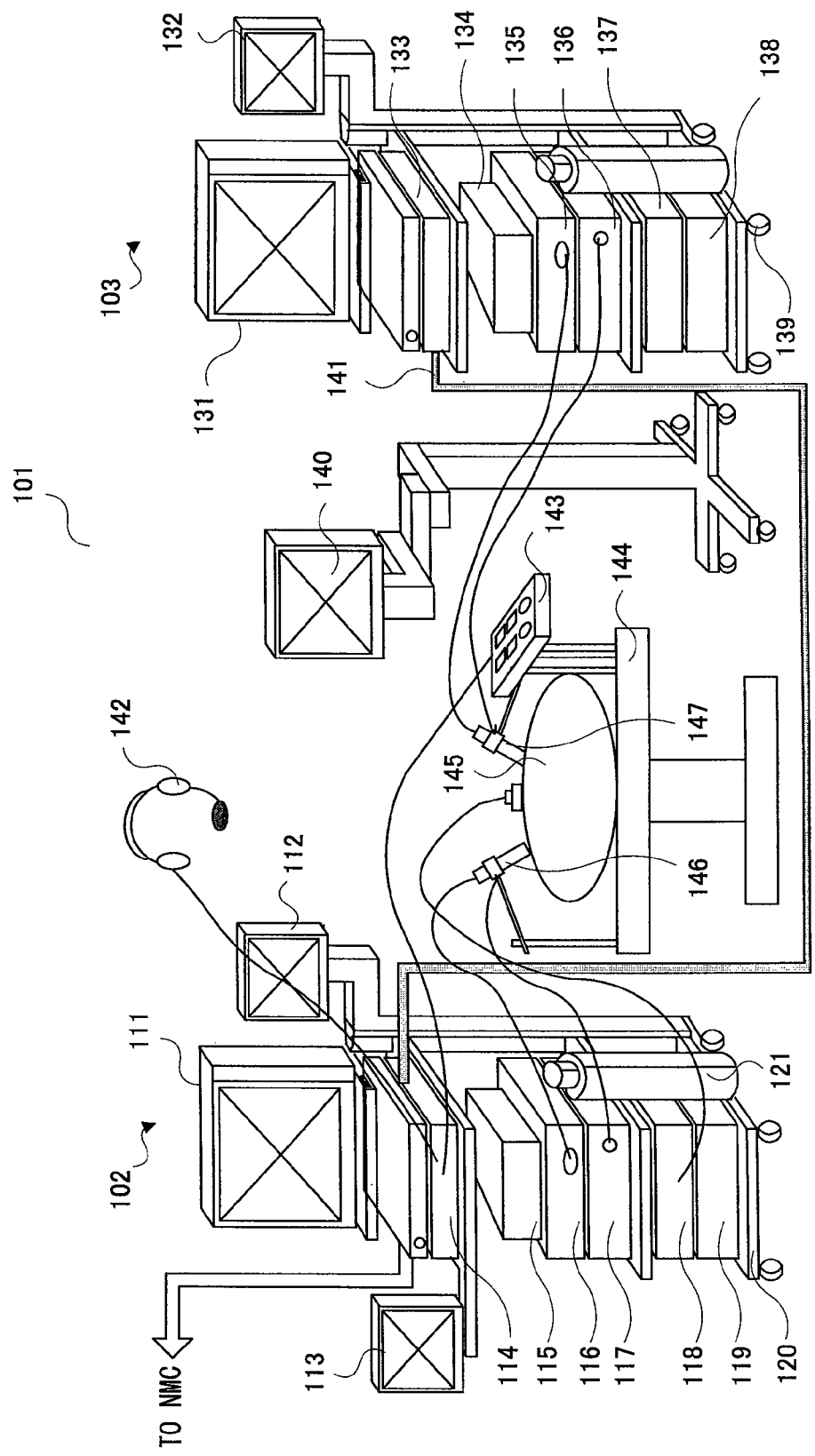
FIG. 1 shows an entire configuration of a medical device control system according to the present embodiment.

Hereinafter, the embodiments of the present invention will be explained in detail, referring to the drawings.

A medical support control system according to the present embodiment includes a medical device control system and a non-medical device control system. The medical device control system includes a plurality of medical devices and a medical controller for controlling these medical devices. The non-medical device control system includes non-medical devices (that may further include medical devices) that are used for operations, and a non-medical controller for controlling these non-medical devices.

An endoscopic operating system will be explained as an example of the medical device control system.

FIG. 1 shows an entire configuration of the medical device control system according to the present embodiment. An endoscopic operating system is shown as a medical device control system 101. In the operating room, a first endoscopic operating system 102 and a second endoscopic operating system 103 beside a bed 144 on which a patient 145 is laid and a wireless remote controller 143 for the operating person are provided.

The endoscopic operating systems 102 and 103 respectively have first and second trolleys 120 and 139 each including a plurality of endoscope peripheral devices used for observation, examination, procedures, recoding, and the like. Also, an endoscope image display panel 140 is arranged on a movable stand.

On the first trolley 120, an endoscope image display panel 111, a central display panel 112, a central manipulation panel device 113, a medical controller (MC) 114, a recorder 115, a video processor 116, an endoscope light source device 117, an insufflation unit 118, and an electrical surgical device 119 are arranged.

The central manipulation panel device 113 is arranged in an unsterilized area to be used by nurses or the like in order to manipulate the respective medical devices in a centralized manner. This central manipulation panel device 113 may include a pointing device such as a mouse, a touch panel, or the like (not shown). By using the central manipulation panel device 113, the medical devices can be managed, controlled, and manipulated in a centralized manner.

The respective medical devices are connected to the MC 114 via communication cables (not shown) such as serial interface cables or the like, and can have communications with one another.

Also, a headset-type microphone 142 can be connected to the MC 114. The MC 114 can recognize voices input through the headset-type microphone 142, and can control the respective devices in accordance with the voices of the operating person.

The endoscope light source device 117 is connected to a first endoscope 146 through a light-guide cable used for transmitting the illumination light. The illumination light emitted from the endoscope light source device 117 is provided to the light guide of the first endoscope 146 and illuminates the affected areas or the like in the abdomen of the patient 145 into which the insertion unit of the first endoscope 146 has been inserted.

The optical image data obtained through the camera head of the first endoscope 146 is transmitted to a video processor 116 through a camera cable. The optical image data undergoes signal processing in a signal processing circuit in the video processor 116, and the video signals are created.

The insufflation unit 118 provides $CO_2$ gas to the abdomen of the patient 145 through a tube. The $CO_2$ gas is obtained from a gas tank 121.

On the second trolley 139, an endoscope image display panel 131, a central display panel 132, a expansion unit 133, a recorder 134, a video processor 135, an endoscope light source device 136, and other medical devices 137 and 138 (such as an ultrasonic processing device, a lithotripsy device, a pump, a shaver, and the like) are arranged. These respective devices are connected to the expansion unit 133 through cables (not shown), and can communicate with one another. The MC 114 and the expansion unit 133 are connected to each other through the expansion cable 141.

The endoscope light source device 136 is connected to a second endoscope 147 through the light-guide cable for transmitting the illumination light. The illumination light emitted from the endoscope light source device 136 is provided to the light guide of the second endoscope 147, and illuminates the affected areas or the like in the abdomen of the patient 145 into which the insertion unit of the second endoscope 147 has been inserted.

The optical image data obtained through the camera head of the second endoscope 147 is transmitted to a video processor 135 through a camera cable. The optical image data undergoes signal processing in a signal processing circuit in the video processor 135, and the video signals are created. Then, the video signals are output to the endoscope image display panel 131, and endoscope images of the affected areas or the like are displayed on the endoscope image display panel 131.

Further, the MC 114 can be controlled by the operating person manipulating the devices in the unsterilized area. Also, the first and second trolleys 120 and 139 can include other devices such as printers, ultrasonic observation devices, or the like.

Figure 2:
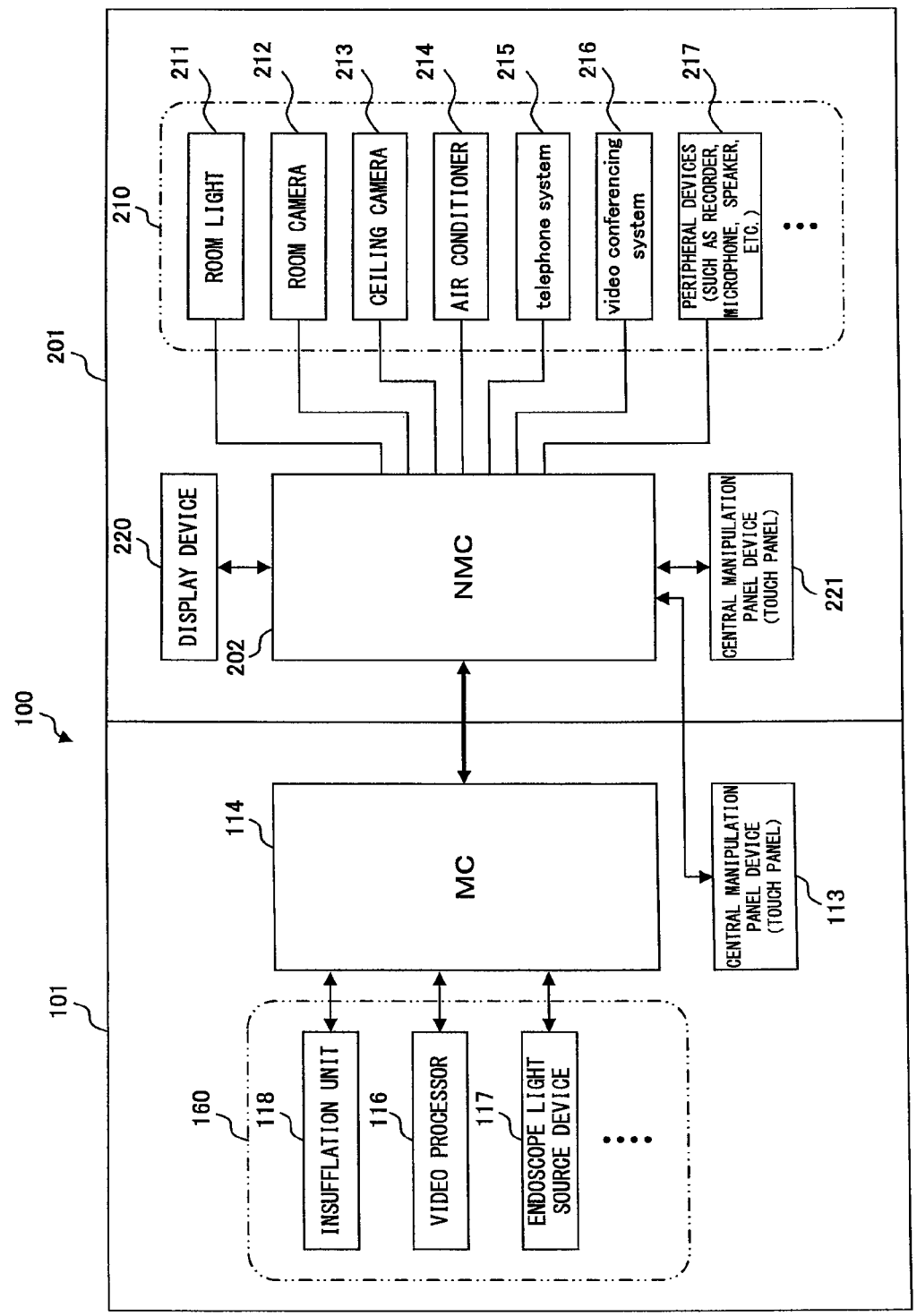
FIG. 2 is a block diagram showing an entire configuration of a medical support control system 100 according to the present embodiment.

FIG. 2 is a block diagram showing an entire configuration of a medical support control system 100 according to the present embodiment. As described above, the medical support control system 100 includes the medical device control system 101 and a non-medical device control system 201. A detailed configuration of the medical device control system 101 is as shown in FIG. 1. However, in FIG. 2, the medical device control system 101 is shown in a simplified manner for simplicity of explanation.

In FIG. 2, a medical device group 160 is a group of medical devices that are directly connected to the medical controller 114 or are indirectly connected to the MC 114 via the expansion unit 133. Examples of the devices included in the medical device group 160 are the insufflation unit 118, the video processor 116, the endoscope light source device 117, the electrical surgical device 119, and the like.

The central manipulation panel device 113 has a touch panel, and in accordance with the information input into the touch panel, the devices connected to the MC 114 or a non-medical device controller (NMC) 202 that will be described later can be manipulated.

The non-medical control system 201 includes the NMC 202 connected to the MC 114 through a communication cable or the like, and a non-medical device group 210. In this configuration, the NMC 202 can transmit and receive, through an image cable, the video signals to and from the medical device group 160 connected to the MC 114.

The NMC 202 controls the non-medical devices (including the audio-visual devices) connected thereto. As shown in FIG. 2, the non-medical device group 210 connected to the NMC 202 according to the present embodiment consists of a room light 211, a room camera 212, a ceiling camera 213, an air conditioner 214, a telephone system 215, a conference system 216 to be used for individuals in remote places (referred to as a video conference system hereinafter), and other peripheral devices 217. Further, a display device 220 and a central manipulation panel device 221 are connected to the NMC 202.

Also, the non-medical device group 210 includes equipment such as light devices provided in the operating room in addition to the AV devices used for recording and reproducing image data.

The display device 220 is a plasma display panel (PDP) or a liquid crystal display (LCD) device, and displays images of the predetermined device or images of the devices selected by nurses or the like through the central manipulation panel device 221. The room light 211 is a device that illuminates the operating room. The room camera 212 is used for shooting images of the situations in the operating room. The ceiling camera 213 is a camera suspended from the ceiling whose positions can be changed. The conference system 216 is a system that displays images and transmits voices of nurses or the like in the medical office or the nurse stations, and enables conversations with them. The peripheral devices 217 are, for example, a printer, a CD player, a DVD recorder, and the like. The central manipulation panel device 221 has a touch panel that is the same as that included in the central manipulation panel device 113, and controls the respective AV devices connected to the NMC 202. The central manipulation panel devices 113 and 221 are referred to as TPs hereinafter.

Figure 3:
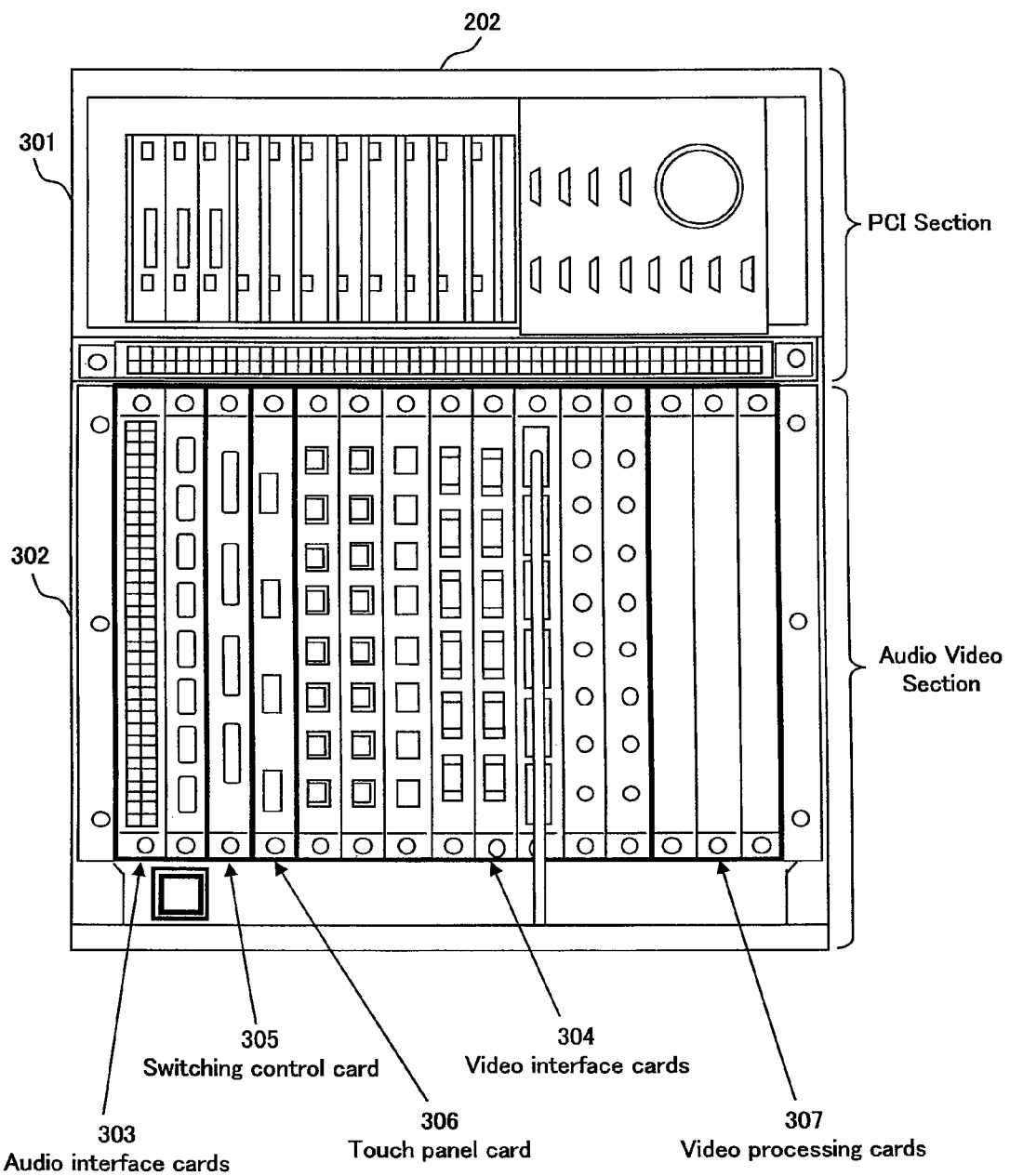
FIG. 3 is a side view showing a configuration of the rear panel of an NMC according to the present embodiment.

FIG. 3 is a side view showing a configuration of the rear panel of the NMC 202 according to the present embodiment. The NMC 202 includes a PCI section 301 and an audio/video section 302.

The PCI section communicates with devices connected to the external environment, and has cards having relay devices and the functions of the RS232C, the digital I/O, the ether net, and the modem in order to control devices in the non-medical device group 210 that are connected to other cards that will be described later.

The audio/video section 302 includes audio interface cards 303 (AIC), video interface cards 304 (VIC), a switching control card 305 (SCC), a touch panel card 306 (TPC), and video processing cards 307 (VPC). Additionally, the respective cards included in the audio/video section 302 of the NMC 202 are detachable.

The AICs 303 are inserted into a plurality of slots for the AICs 303 in order to receive, process (amplify, for example), and output audio signals input from a device such as an IC or the like that includes a transmitter/receiver existing in the external environment.

Each of the VICs 304 creates, when a video signal is input into it from the external environment, a common signal, said common signal being different from any of the video signals input into and output from the VICs 304 and said common signal being used commonly in the NMC 202.

In this configuration, examples of the video signals include an HD/SD-SDI (High Definition/Standard Definition-Serial Digital Interface) signal, an RGB/YPbPr signal, an S-Video signal, a CVBS (Composite Video Blanking and Sync) signal, a DVI-I (Digital Visual Interface Integrated) signal, an HDMI (High-Definition Multimedia Interface) signal, and the like.

Also, the VICs 304 have a function of converting the common signals into video signals that are appropriate to the output destinations. Also, the VICs 304 can be inserted into a plurality of slots for the VICs 304. Also, the VICs 304 can have a common interface connector 405. Also, the VICs 304 use paths for directly outputting the input video signals without converting the signals when the VICs 304 are turned off.

The SCC 305 selects the VIC 304 as the output destination in accordance with instructions given from the external environment. Also, the SCC 305 obtains VIC-related information including identification information used for identifying the VICs 304 and position information specifying the positions of the corresponding VICs 304. The identification information is obtained from the VICs 304. Then, the SCC 305 detects, on the basis of the VIC-related information, the position of the VIC 304 as the output destination set in accordance with the instruction given from the external environment, selects the VIC 304 as the output destination for the common signal, and determines whether or not this output should be made via the VPC 307.

The SCC 305 is connected to the TP 221 via, for example, the TPC 306, and the manipulator sets, in the SCC 305, which of the VICs 304 is to be selected as the output destination and whether or not the output should be made via the VPC 307.

The VPC 307, in accordance with the video signals expressed by the common signals, processes the input signals into video signals appropriate to the selected VIC 304.

Figure 4:
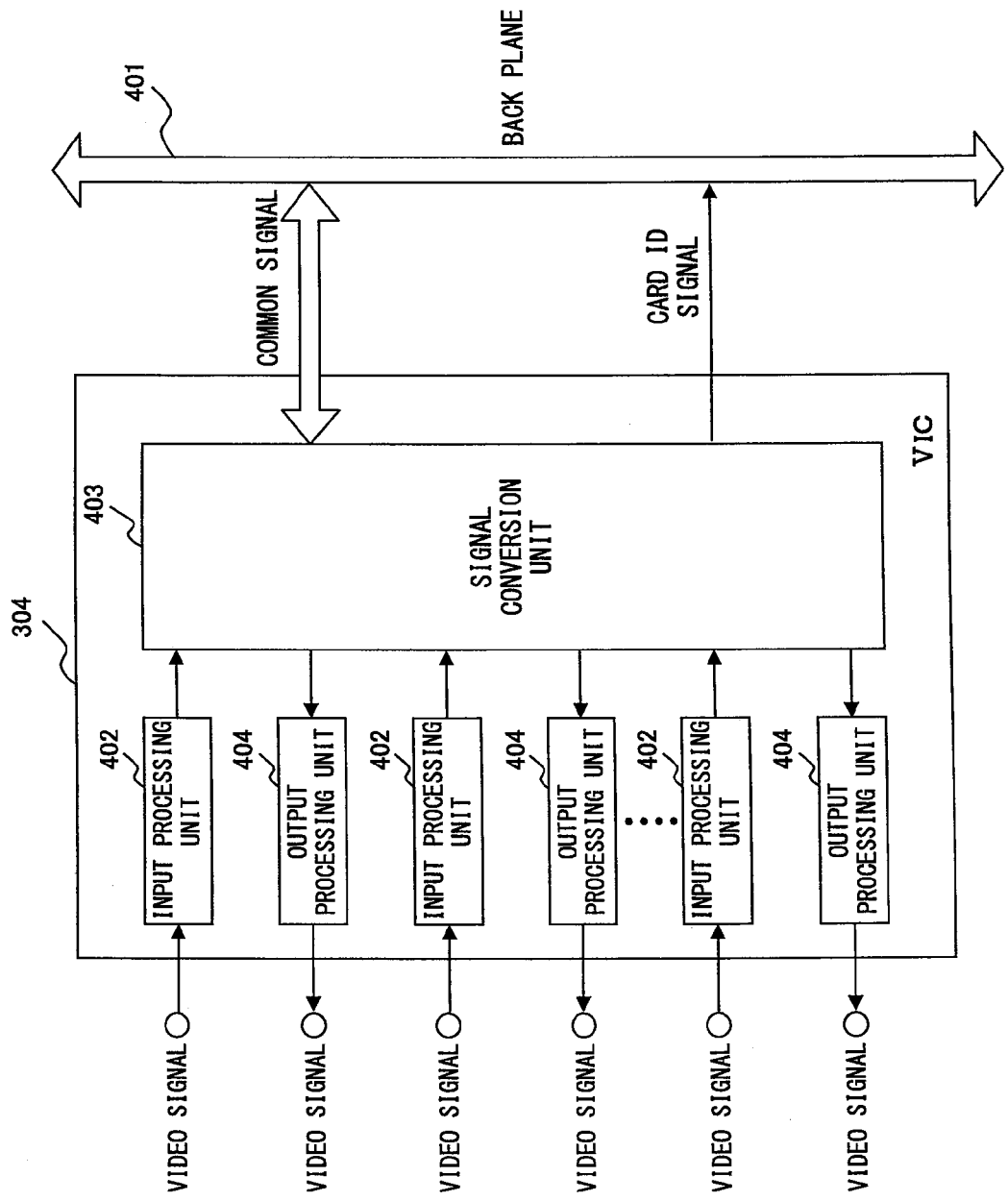
FIG. 4 shows a configuration of a video interface card.

FIG. 4 shows a configuration of the VIC 304.

The VIC 304 is attached to a back plane 401, and includes an input processing unit 402, a signal conversion unit 403, an output processing unit 404. In this configuration, the back plane 401 includes slots into which the audio interface cards (AIC) 303, the video interface cards (VIC) 304, the switching control card (SCC) 305, a touch panel card (TPC) 306, and the video processing cards (VPC) 307 are inserted. These cards perform communications via the back plane 401.

The VICs 304 transmit and receive, through the back plane 401, the common signals that are obtained by converting the video signals by using the signal conversion unit 403, the common signals input through the cards other than the VICs 304, the identification information for identifying the VICs 304, and the position information for specifying the positions of the slots into which the VICs have been inserted.

The input processing unit 402 receives the video signals output from devices (medical devices and non-medical devices) that are connected to the NMC 202 and are used for outputting video signals, and transfers the received video signals to the signal conversion unit 403.

The signal conversion unit 403 converts the common signal, said common signal being different from any of the video signals input into and output from the VICs 304 and said common signal being used commonly in the NMC 202, into video signals, and vice versa.

In other words, the signal conversion unit 403 converts the video signal input from the input processing unit 402 into the common signals, and outputs the common signals to the back plane 401. Also, the signal conversion unit 403 obtains the common signal input into the VICs 304 via the back plane 401, and converts the obtained signals into video signals appropriate to the selected VIC 304.

Also, the signal conversion unit 403 outputs, via the back plane 401, VIC-related information (a card ID signal) consisting of the identification information used for identifying the VIC 304 and the position information specifying the position of the slot into which the VIC 304 has been inserted.

The output processing unit 404 outputs the video signals obtained by the conversion by using the signal conversion unit 403.

Figure 5:
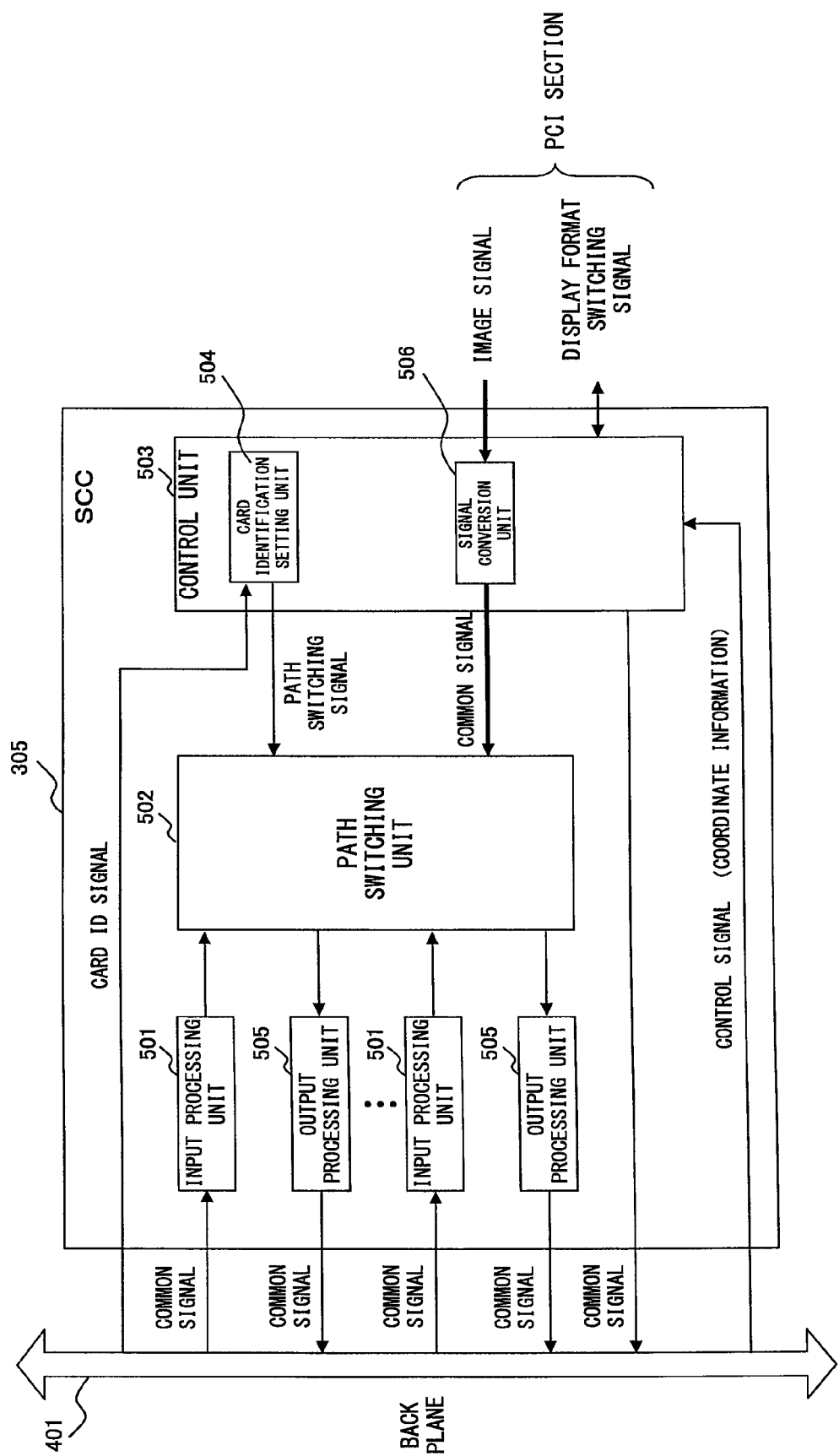
FIG. 5 shows a configuration of a switching control card.

FIG. 5 shows a configuration of the SCC 305.

The SCC 305 is attached to the back plane 401, includes an input processing unit 501, a path switching unit 502, a control unit 503, and an output processing unit 505, and switches the paths for the serialized common signals.

The input processing unit 501 receives the common signals input from the back plane 401 and transfers the received signals to the path switching unit 502.

The path switching unit 502 switches the paths for the common signals. For example, the path switching unit 502 determines, on the basis of the path switching signals output from the control unit 503, the path for the common signal to be output to the output-destination VIC 304. Also, when image processing is to be performed in the VPC 307, the path switching unit 502 determines, on the basis of the path switching signal, the path for the common signal to be output to the output-destination VPC 307. Also, the path switching unit 502 determines the path to the VIC 304 for the common signal that is output from the VPC 307 after the image processing.

The control unit 503 has a card identification setting unit 504 and a signal conversion unit 506, transfers control signals (including display format switching signals) input into the PCI section 301 from the endoscope, and controls the respective units in the SCC 305 by obtaining the control signals input from the PCI section 301.

Also, the control unit 503 obtains the control signals (including display format switching signals) transferred from the PCI section 301, and transfers, to the back plane 401 via the VPC 307, the display format switching signals used for switching the image processing of the VPC 307.

The card identification setting unit 504 in the control unit 503 outputs path switching signals that are used for determining the output paths for the output-destination VIC 304 and the VPC 307 on the basis of the identification information and the position information of the VIC-related information (card ID information) and the selection information of the output-destination VIC 304 and the VPC 307 set in accordance with the control signals from the TPs 113 and 221.

In order to perform setting from the external environment, selection information for the output-destination VIC 304 is set in the card identification setting unit 504 from, for example, the TPs 113 and 221 in order to cause the input-destination VIC 304 and the output-destination VIC 304 to correspond to each other. By establishing this correspondence, the position of the output-destination VIC 304 is detected from the VIC-related information in order to determine the output-destination VIC 304 for the common signals.

The output processing unit 505 outputs, to the output-destination VIC 304 set in the above step, the common signals output from the path switching unit 502.

The signal conversion unit 506 converts into common signals the image signals (such as GUI image signal) transferred from the PCI section 301, and transfers the signals to the path switching unit 502.

Figure 6:
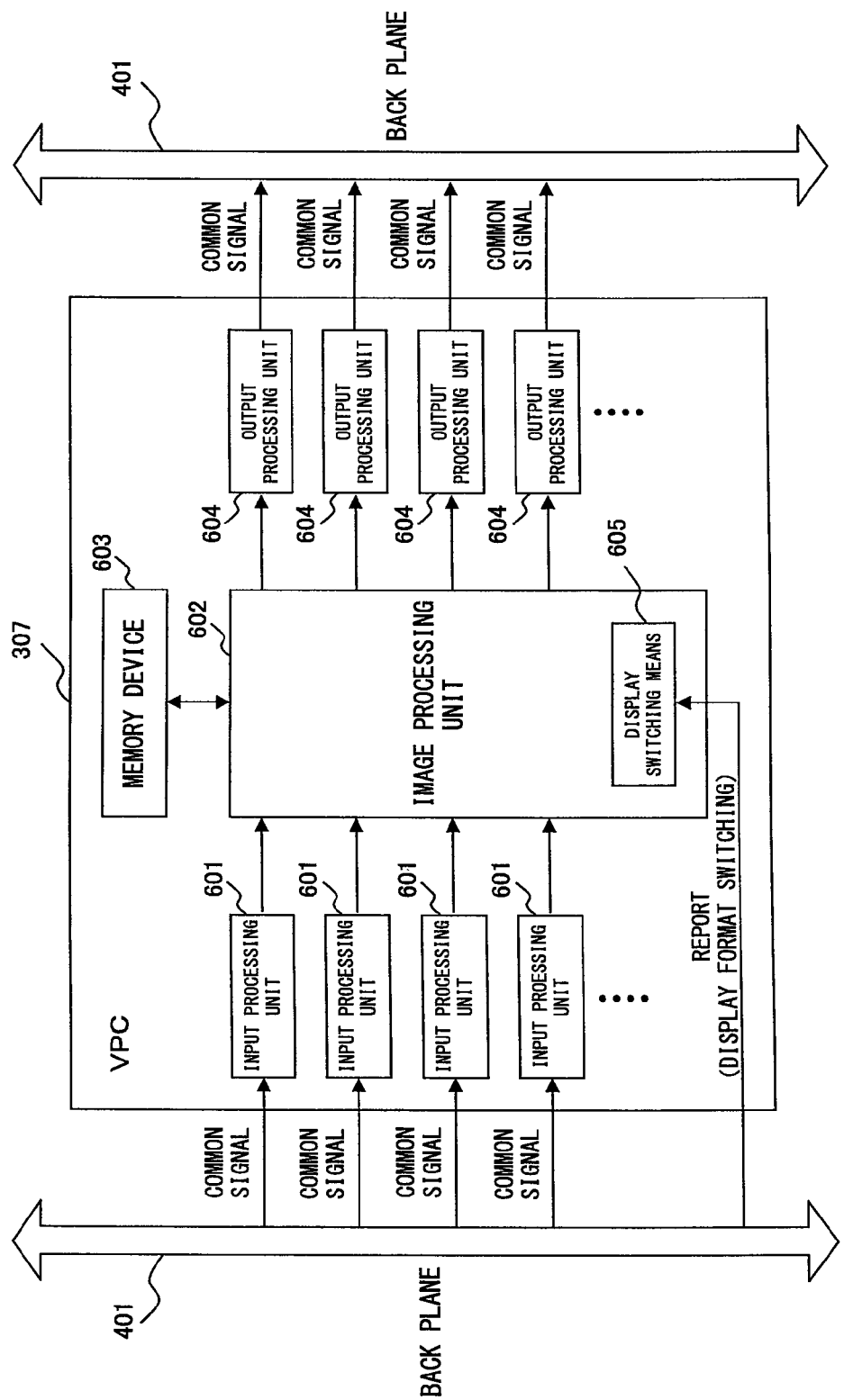
FIG. 6 shows a configuration of a video processing card.

FIG. 6 shows a configuration of a VPC 307.

The VPCs are attached to the back plane 401, and include an input processing unit 601, an image processing unit 602, a memory device 603, and an output processing unit 604.

The input processing unit 601 receives the common signals input from the back plane 401, and transfers the received common signals to the image processing unit 602.

The image processing unit 602, on the basis of the video signals expressed by the common signals, processes the signals into video signals appropriate to the selected VIC 304, and also holds the common signals input from the input processing unit 601 in the memory device 603, and performs image processing on the held common signals in order to output the signals. It is also possible that the common signals undergo the image processing after being converted into the prescribed video signals.

The above image processing includes, for example, the de-interlacing, the rate control, the scaling, the mirror, the rotation, the picture in picture (PIP), the picture out picture (POP), and the like.

The output processing unit 604 transfers, to the SCC 305 via the back plane 401, the common signals that have undergone the image processing performed by the image processing unit 602.

A display switching means 605 causes the display device to sequentially display images in formats according with the display format switching signals transmitted from the manipulation unit in the medical device.

Figure 7:
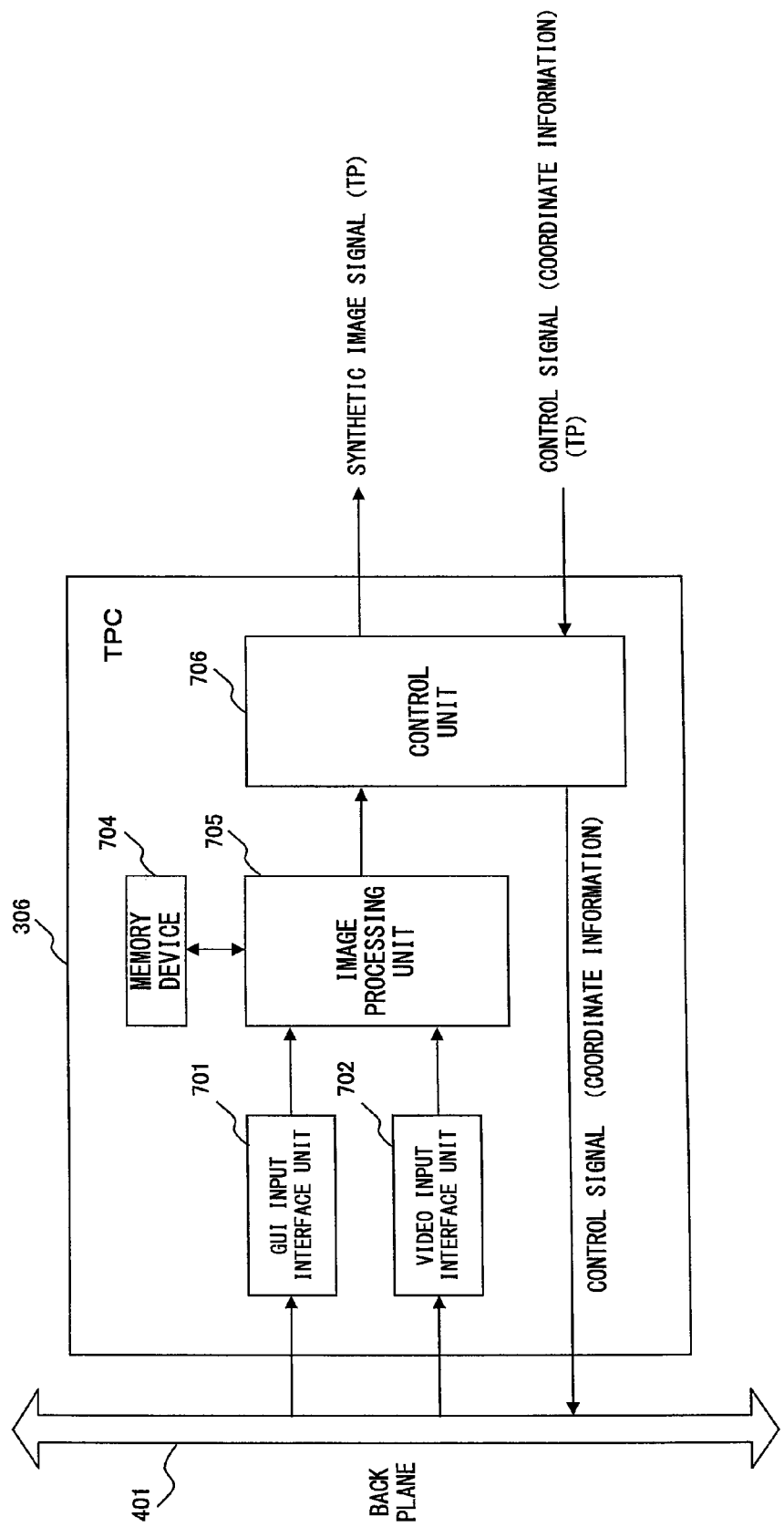
FIG. 7 shows a configuration of a touch panel control card.

FIG. 7 shows a configuration of the touch panel card 306.

The TPC 306 is included in the back plane 401, and has a function of editing images in accordance with the instructions given by the TPs 113 and 221.

The TPC 306 includes a GUI input interface unit 701, a video input interface unit 702, a memory device 704, an image processing unit 705, and a control unit 706. The GUI input interface unit 701 and the video input interface unit 702 collect images in accordance with the instructions given by the TPs 113 and 221.

The GUI input interface unit 701 is an interface that obtains display layout information (hereinafter, referred to as a GUI (Graphical User Interface) image) created in the PCI section 301, and transfers the image to the image processing unit 705 via the SCC 305 and the back plane 401.

The video input interface unit 702 obtains medical images from the medical device group 160, and outputs the data obtained from the images to the image processing unit 705.

In this configuration, the medical images are input into the VIC 304 as video signals, are converted into common signals in the VIC 304, and are input into the SCC 305. Thereafter, the medical images that have been converted into the common signals are output to the output-destination VPC 307 on the basis of the setting in the SCC 305, undergo image processing in the VPC 307, and are input into the video input interface unit 702.

The memory device 704 holds the GUI images obtained in the GUI input interface unit 701, the medical images obtained in the video input interface unit 702, or the synthetic images processed in the image processing unit 705.

The image processing unit 705 performs image processing on the respective images obtained in the GUI input interface unit 701 and the video input interface unit 702, and transfers the image-processed images to the control unit 706. In other words, by including the medical images in a prescribed region in the GUI image, the GUI image and the medical image are synthesized.

The control unit 706 directly outputs the images that have undergone the image processing in the TP 221. Also, the control unit 706 is a device for controlling the entirety of the TPC 306, and outputs the images that have undergone the image processing in the image processing unit 705 to the TPs 113 and 221.

Also, control signals (coordinate information) transferred from the TPs 113 and 221 are output to the back plane 401, and are transferred to the SCC 305.

Figure 8:
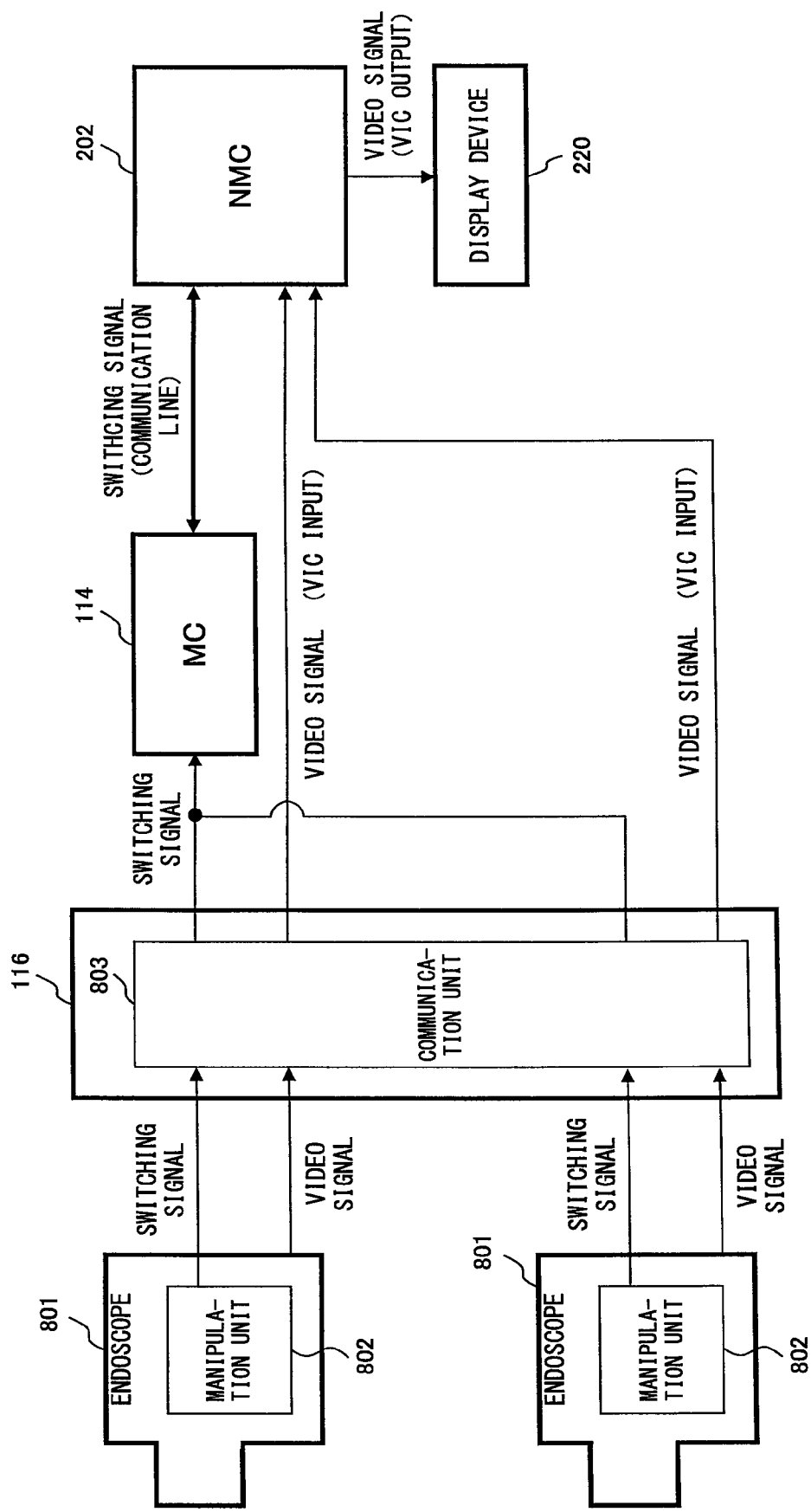
FIG. 8 shows a flow of switching signals and video signals from an endoscope to the NMC.

FIG. 8 shows a configuration including the endoscopes 801 that are used as external control devices arranged in the sterilization area and the medical support control system. The example in FIG. 8 includes the endoscopes 801, the video processor 116, the MC 114, the NMC 202, and the display device 220.

A plurality of the endoscopes 801 have switch devices used for switching the display formats of medical images, and manipulation units 802 for detecting the switching instructions given by the switch devices.

The manipulation unit 802 outputs switching signals to the video processor 116 when detecting the switching instruction given by, for example, the switch device.

When receiving a switching signal, the communication unit 803 in the video processor 116 transfers this switching signal to the MC 114.

The MC 114, having received the switching signal, transfers the switching signal to the NMC 202 via, for example, a communication line.

The NMC 202 causes the display device to display images in the switched display formats each time the NMC 202 receives the switching signal. The display format means the results of the image processing on medical images output from the endoscopes 801.

Figure 9:
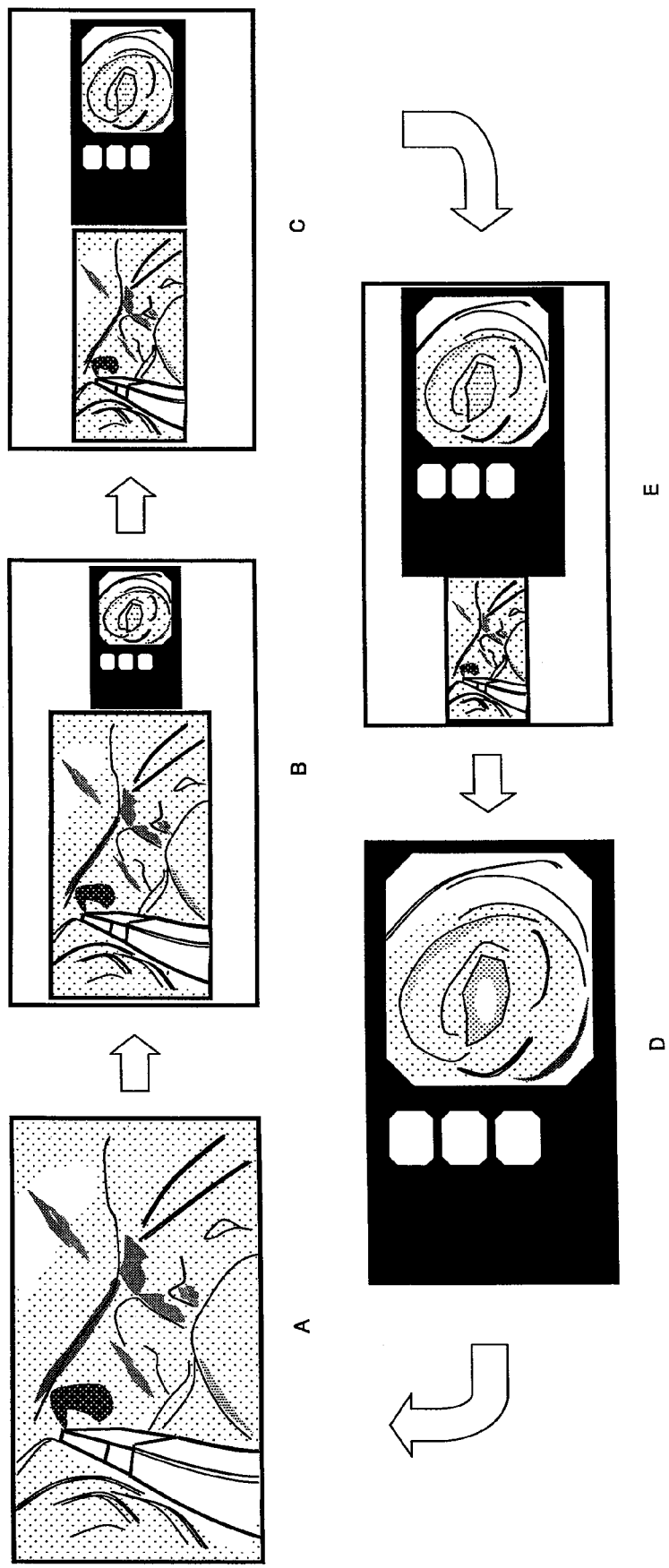
FIG. 9 shows switching of display formats.

FIG. 9 shows display formats. The images shown in FIG. 9 are medical images that are switched in accordance with the switching instructions given by the endoscopes 701. In FIG. 9A, a medical image transferred from the endoscope 701 is displayed at full screen. In FIG. 9B, the medical image displayed in FIG. 9A and a medical image shot by a medical device other than the endoscope 701 are displayed at different sizes. In FIG. 9C, the two medical images in FIG. 9B are displayed at the same size. In FIG. 9D, a medical image shot by a medical device other than the endoscope 701 is displayed at full screen. In FIG. 9E, the images are displayed in sizes reversed from those in FIG. 9B.

Figure 10:
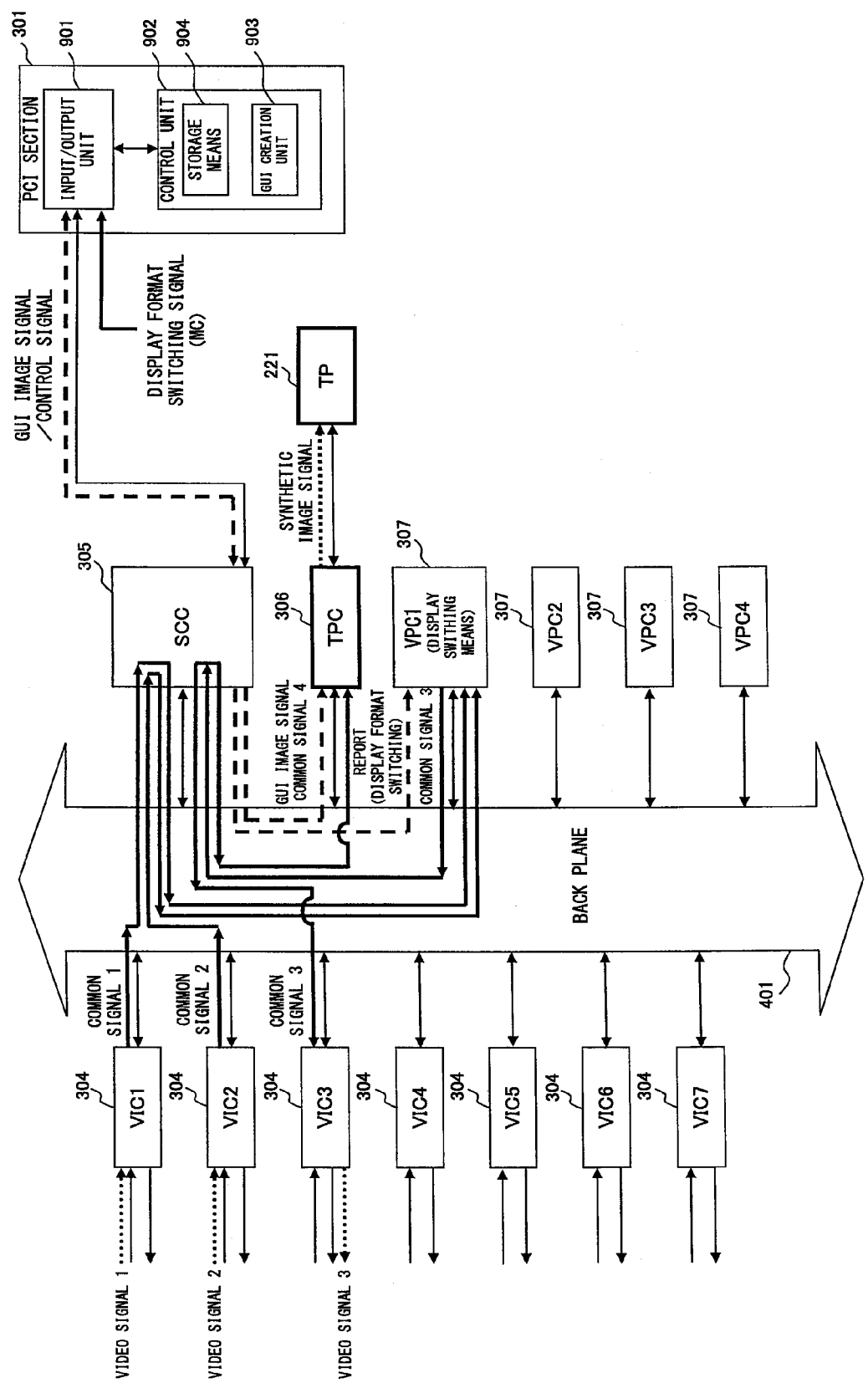
FIG. 10 shows a flow of signals when the video signals were switched.

FIG. 10 shows a flow of respective image signals and control signals when images are edited.

The users select medical images to be edited by using the TP 221, an output-destination display device and a type of image processing. In FIG. 10, a medical image 1 and a medical image 2 transmitted from a plurality of medical devices (such as endoscopes) are selected, an output-destination display device 220 connected to a VIC3 304 is selected, and the PIP or the POP is selected as the image processing.

The medical images 1 and 2 are respectively input to the VIC1 304 and the VIC2 304 in the form of the video signals 1 and 2 (dotted lines), and are respectively converted into common signals 1 and 2 by the VIC1 304 and the VIC2 304.

The common signals 1 and 2 (represented by solid lines) are input into the SCC 305 via the back plane 401, and are input into the VPC1 307 via the prescribed path set by the SCC 305 in accordance with the setting made on an edition screen in the TP 221.

In the VPC1 307, image processing is performed on the common signals 1 and 2, and a common signal 3 (represented by a solid line) is output. Then, a GUI image is created in a GUI creation unit 903 in a control unit 902 in the PCI section 301, and is transferred to the SCC 305 via an input/output unit 901. The GUI image signal obtained in the SCC 305 is converted into a common signal 4, and is transferred to the TPC 306 via the back plane 401.

Synthetic image signals (represented by a dashed line) output from the TPC 306 are displayed in the TP 221 via the rear panel.

Next, the users view the synthetic images displayed on the TP 221, and determine the image (display format). In the case of FIG. 9, for example, respective display formats corresponding to the five images (A-E) are determined for each image. When the display format is determined by the TP 221, a determination signal is transferred to the input/output unit 901 in the PCI section 301. Thereafter, the control signal is transferred to the control unit 902. In the control unit 902, the display format and data corresponding to the display format are stored in the form of, for example, a table in a memory device (storage means 904). The determination signal includes data necessary to display the display format (information such as the type of the image processing, the image size, the position of the image, etc.).

Also, when determined, the determination signal is output from the TP 221 to the SCC 305, and in the SCC 305, the paths for the VPC1 304 and the VIC2 304 for inputting a video signal, and the output-destination VIC3 304 are formed, and the input/output path for the VPC1 307 is set.

Also, into the input/output unit 901 in the PCI section 301, the display format switching signal is transferred from the endoscope 801. In accordance with the display format switching signal, the display format stored on the table in the control unit 902 is selected, and the selected display format is reported to the VPC 307 (display switching means 605) via the SCC 305. In accordance with this report, the type of a display format is set in the VPC 307, and images in the display format can be displayed on the display device.

The VPC 307 converts the synthetic image of the set display format into the common signal 3, and transfers it to the SCC 305. The SCC 305 transfers the common signal 3 to the VIC3 304, and the VIC3 304 is output to a desired display device.

Figure 11:
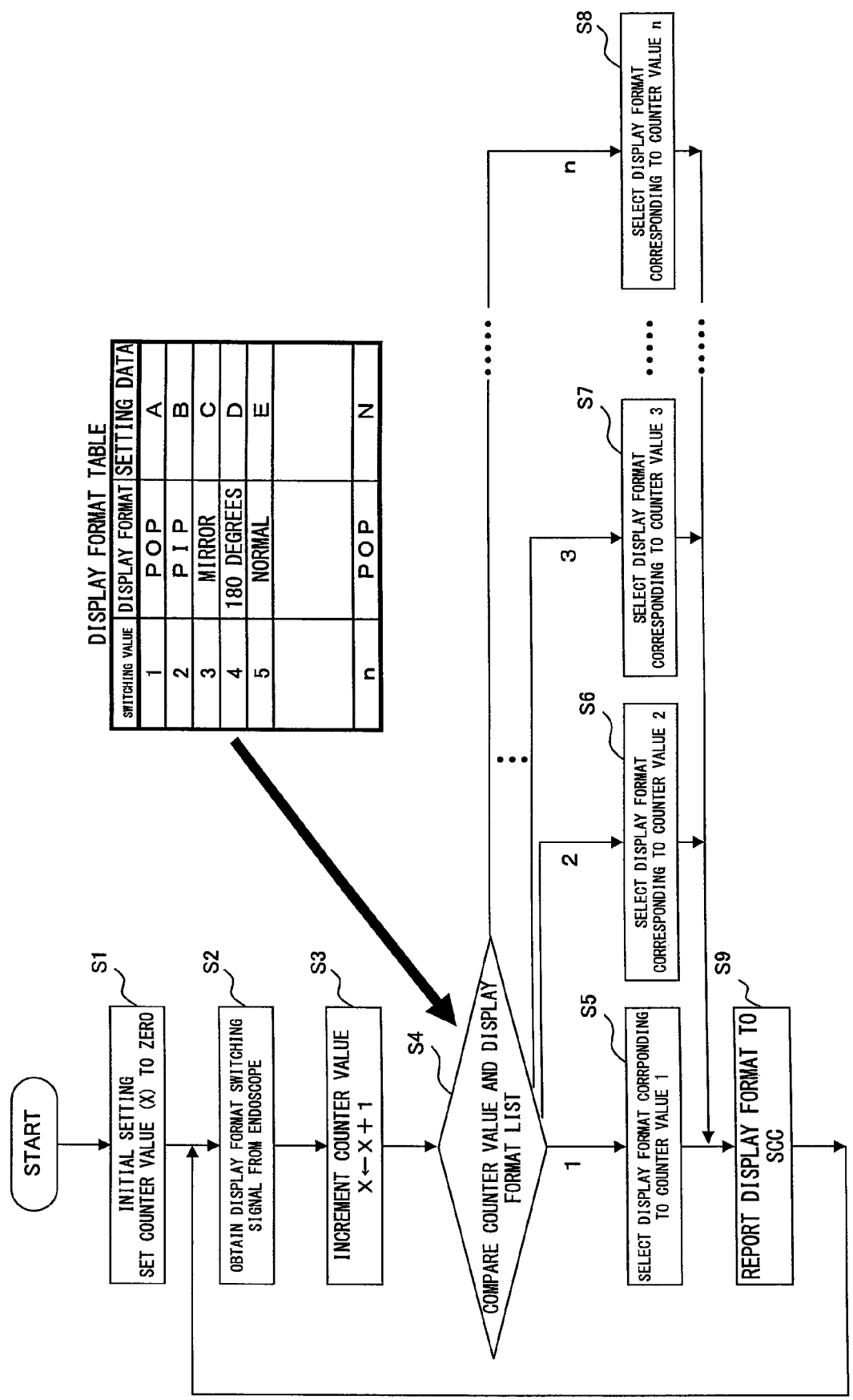
FIG. 11 is a flowchart for a process for controlling the display format in accordance with the switching signals.

FIG. 11 is a flowchart for the switching process of display formats.

In step S1, the initial setting is performed. For example, the voltage level of the switching signal transferred from the MC is monitored, and when it has become "high", the value of a counter provided in the control unit 902 is incremented, and if a display format stored in advance is to be selected in accordance with the counter value, the counter value (X) is set to zero (X←zero). In this example, a counter is used to perform the toggle switching; however, this is not intended to be limiting and it is also possible that switching can be performed from devices connected to the NMC 202.

In step S2, the switching signal is obtained from the endoscope 801. As explained in the above, the switching signal is obtained in the PCI section 301 via the MC 114.

In step S3, the counter value is incremented (X←X+1). Detecting the change in the switching signal, the control unit 902 increments the counter value. The counter value returns to one when the value has reached the upper limit.

In step S4, the counter value and the switching value in the table (display format table) are compared to each other. When the comparison result is "1", the process proceeds to step S5. Similarly, the process proceeds to the respective steps in accordance with the counter value.

The table (display format table), as shown in FIG. 11, is set by the TP 221 in advance. The table shown in FIG. 11 stores "switching value", "display format", and "setting data". The "switching value" is a number assigned in accordance with the display format set by the TP 221, and corresponds to the counter value of the counter. The types of the image processing performed in the VPC 307 are stored as the "display format". The detailed setting for the image processing set as the display format is stored as the "setting data". Examples of the detailed setting are sizes of images, positions of images, and the like. Also, in the table (display image table), the "display format" and the "setting data" are separated; however, they may be processed together.

In step S5, the display format corresponding to the counter value 1 is selected, and "display format" and "setting data" are prepared as the display format switching signals.

In step S6, the display format corresponding to the counter value 2 is selected, and "display format" and "setting" data are prepared as another display format switching signals.

In step S7, the display format corresponding to the counter value 3 is selected, and "display format" and "setting" data are prepared as yet another display format switching signals.

In step S8, the display format corresponding to the counter value n (integer) is selected, and "display format" and "setting" data are prepared as still another display format switching signals.

In step S9, the display switching signals are transferred to the SCC 305.

In the present example, example 1, the display format is switched by using a switch device provided in the endoscope mainly; however, it is also possible for the display format to be switched by the TP 221.

According to the above configuration, it is possible to provide a medical support control system that controls medical devices and non-medical devices.

Conventionally, an operating person (such as a physician) has given instructions for changing display formats, and personnel such as nurses have had to edit a plurality of images by using the TP 221 in accordance with the instructions. Accordingly, troublesome manipulations have been required each time the display formats were to be switched. Also, sometimes it has been impossible to view necessary images at proper timings.

By employing the above configuration, necessary images can be viewed at proper timings. Also, it is possible to change the display formats from the sterilization area.

Variation Examples

Display format tables are prepared respectively for procedures and medical instruments employed. Similarly to example 1, the display formats are stored in the storage means in a prescribed order. Because different patterns of image processing have to be used depending upon the procedures and medical instruments employed, they are stored in advance.

As shown in FIG. 12, a plurality of display format tables such as for procedures 1, 2, users 1, 2 . . . , etc. are stored in the storage means. Users input the table contents through the TP 221 as in the example 1.

Then, when using the endoscopes, users select a table that is to be used at that time from the plurality of the display format tables by using the TP 221.

By preparing the display format tables as described above, it becomes unnecessary to perform setting for each of the procedures or users, which reduces the time used for the preparation for the operation.

The scope of the present invention is not limited to the above embodiments, and various alterations and modifications are allowed without departing from the spirit of the present invention.

What is claimed is:

1. A medical support control device configured to display on a display device an image captured by a medical device, the medical support control device comprising:
 a storage unit configured to store display format types of the image displayed according to video signals output from the medical device and to store a prescribed order for the display format types; and
 a display switch which causes the display device to display the image displayed in the display format in the prescribed order, the display format switched by the display switch according to the prescribed order based on a display format switching signal from an operation unit of the medical device,
 wherein the storage unit stores setting data for setting an image corresponding to the display format prepared for a procedure, an instrument, and a user, the setting data being stored corresponding to the display format.

2. The medical support control device according to claim 1, wherein:
 the display switch compares a count value with a switching value assigned to each display format stored in the storage unit, and causes the display device to display the image in the format based on a reporting of a result of selecting the display format for which the count value and the switching value coincide,
 wherein the count value is updated every time the display format switching signal is received or represents a number of received display format switching signals.

3. The medical support control device according to claim 1, further comprising:
 a central manipulation panel device configured to perform operations identical with operations performed by the operation unit of the medical device.

4. The medical support control device according to claim 1, comprising:
 a first medical device configured to capture a first medical image; and
 a second medical device configured to capture a second medical image, wherein:
 the display switch updates a count value upon receipt of the display format switching signal, selects the display format such that a switching value assigned to each of the display format types stored in the storage unit matches the count value, and displays the first medical image and the second medical image on the display device in the selected display format,
 wherein the first medical image and the second medical image are captured by an endoscopic device or an ultrasonic treatment device.

5. The medical support control device according to claim 4, wherein:
 the storage unit stores, in association with the switching value, information about displaying the first medical image or the second medical image with a varied image size, information to display the first medical image and the second medical image as a picture in picture, and information to display the first medical image and the second medical image as a picture out picture.

6. The medical support control device comprising:
 a first medical device configured to capture a first medical image;
 a second medical device configured to capture a second medical image;
 a display device configured to display the first medical image and the second medical image;
 a display format storage unit configured to store display format types for the first medical image and the second medical image and to store a prescribed order for the display format types;
 a display format switch which is provided with the first medical device arranged in a sterilization area and switches the display formats of medical images;
 an operation unit which is provided with the first medical device arranged in a sterilization area, detects a switching instruction given by the display format switch, and outputs switching signals according to a result of the detection;
 a controller which causes a display of the first medical image or of the second medical image on the display device in the prescribed order of the display format types stored in the display format storage unit, in response to an output result of the operation unit.

7. The medical support control device according to claim 6, wherein:
 the controller updates a count value upon receipt of the switching signal, selects the display format such that a switching value assigned to each of the display format types stored in the display format storage unit matches the count value, and displays the first medical image and the second medical image on the display device in the selected display format,
 wherein the first medical image and the second medical image are captured by an endoscopic device or an ultrasonic treatment device.

8. The medical support control device according to claim 7, wherein:
 the display format storage unit stores, in association with the switching value, information about displaying the first medical image or the second medical image with a varied image size, information to display the first medical image and the second medical image as a picture in picture, and information to display the first medical image and the second medical image as a picture out picture.

* * * * *